(12) United States Patent
Schwarzwald et al.

(10) Patent No.: US 10,960,845 B2
(45) Date of Patent: Mar. 30, 2021

(54) CURVED AIRBAG AND METHOD OF MANUFACTURING

(71) Applicant: Key Safety Systems, Inc., Sterling Heights, MI (US)

(72) Inventors: Jan Hendrik Schwarzwald, Bad Camberg (DE); Hichem Mrad, Bischofsheim (DE); Christian Schickle, Mainz (DE)

(73) Assignee: Key Safety Systems, Inc., Sterling Heights, MI (US)

(*) Notice: Subject to any disclaimer, the term of this patent is extended or adjusted under 35 U.S.C. 154(b) by 0 days.

(21) Appl. No.: 16/098,024

(22) PCT Filed: Oct. 11, 2017

(86) PCT No.: PCT/US2017/056057
§ 371 (c)(1),
(2) Date: Oct. 31, 2018

(87) PCT Pub. No.: WO2018/071483
PCT Pub. Date: Apr. 19, 2018

(65) Prior Publication Data
US 2020/0031305 A1 Jan. 30, 2020

Related U.S. Application Data

(60) Provisional application No. 62/406,110, filed on Oct. 10, 2016.

(51) Int. Cl.
*B60R 21/233* (2006.01)
*B60R 21/2338* (2011.01)
(Continued)

(52) U.S. Cl.
CPC .......... *B60R 21/233* (2013.01); *B60R 21/239* (2013.01); *B60R 21/2338* (2013.01);
(Continued)

(58) Field of Classification Search
CPC ............. B60R 21/233; B60R 21/2338; B60R 21/239; B60R 2021/0051;
(Continued)

(56) References Cited

U.S. PATENT DOCUMENTS 3,731,949 A 5/1973 Radke
3,747,952 A 7/1973 Graebe
(Continued)

FOREIGN PATENT DOCUMENTS

DE 19946477 3/2001
EP 1475276 11/2004
(Continued)

OTHER PUBLICATIONS

Communication Pursuant to Article 94(3) EPC, in connection to European Application No. 17794459.2, dated Jul. 7, 2020. 6 pages.

*Primary Examiner* — Timothy Wilhelm
(74) *Attorney, Agent, or Firm* — Meunier Carlin & Curfman LLC

(57) ABSTRACT

An airbag (10) comprises a plurality of interconnected adjacent inflatable cells, wherein a cell is attached to an adjacent cell by at least two seam lines (31, 32), said lines being spaced from each other to define a cell area, which is comprising a gas passage portion (1c, 2c, 3c, 4c) between said adjacent cells.

20 Claims, 8 Drawing Sheets

(51) Int. Cl.
  *B60R 21/239* (2006.01)
  *B60R 21/00* (2006.01)
  *B60R 21/235* (2006.01)
(52) U.S. Cl.
  CPC ............... *B60R 2021/0051* (2013.01); *B60R 2021/23324* (2013.01); *B60R 2021/23538* (2013.01); *B60R 2021/23576* (2013.01)
(58) Field of Classification Search
  CPC .......... B60R 2021/23324; B60R 2021/23538; B60R 2021/23576
  See application file for complete search history.

(56) References Cited

U.S. PATENT DOCUMENTS

| | | | |
|---|---|---|---|
| 5,458,366 A | 10/1995 | Hock et al. | |
| 5,588,672 A | 12/1996 | Karlow et al. | |
| 6,158,767 A | 12/2000 | Sinnhuber | |
| 6,685,217 B2 | 2/2004 | Abe | |
| 7,000,943 B2* | 2/2006 | Hasebe | B60R 21/233 280/729 |
| 7,338,069 B2 | 3/2008 | Breed | |
| 7,434,837 B2* | 10/2008 | Hotta | B60R 21/206 280/729 |
| 7,445,232 B2* | 11/2008 | Takimoto | B60R 21/233 180/271 |
| 7,503,582 B2* | 3/2009 | Sendelbach | B60R 21/23138 280/729 |
| 7,661,702 B2* | 2/2010 | Ochiai | B60R 21/232 280/730.2 |
| 7,726,684 B2 | 6/2010 | Breed | |
| 7,934,747 B2* | 5/2011 | Miyata | B60R 21/231 280/729 |
| 8,151,722 B2* | 4/2012 | Kumagai | B60R 21/233 112/475.08 |
| 8,186,715 B2* | 5/2012 | Miyata | B60R 21/231 280/730.1 |
| 8,272,667 B2* | 9/2012 | Schneider | B60R 21/206 280/730.1 |
| 8,282,129 B2* | 10/2012 | Choi | B60R 21/233 280/743.1 |
| 8,770,617 B2* | 7/2014 | Abele | B60R 21/2338 280/730.1 |
| 9,469,271 B2* | 10/2016 | Sommer | B60R 21/2338 |
| 10,183,645 B2* | 1/2019 | Rose | B60R 21/01552 |
| 10,293,775 B2* | 5/2019 | Wang | B60R 21/205 |
| 10,351,091 B2* | 7/2019 | Abe | B60R 21/239 |
| 2005/0151351 A1* | 7/2005 | Enders | B60R 21/233 280/730.1 |
| 2011/0101660 A1* | 5/2011 | Schneider | B60R 21/206 280/731 |
| 2013/0088056 A1 | 4/2013 | Quatanens et al. | |
| 2016/0355152 A1* | 12/2016 | Perez Garcia | B60R 21/233 |

FOREIGN PATENT DOCUMENTS

| | | |
|---|---|---|
| EP | 1698526 | 9/2006 |
| JP | 2011105186 | 6/2011 |
| WO | 2008047599 | 4/2008 |

* cited by examiner

CURVED AIRBAG AND METHOD OF MANUFACTURING

FIELD OF THE INVENTION

The present invention relates to an airbag for deployment in a vehicle. In greater detail, the present invention relates to a curved, or 3-D, airbag and to a method of manufacturing said airbag.

BACKGROUND OF THE INVENTION

Curved airbags, or 3-D airbags, are airbags that require a curvature to deploy between an occupant and a part of a vehicle. The curved part is necessary because the inflator is located in a vehicle area that prevents the airbag from deploying in a straight direction. Knee airbags and passenger airbags are typical examples of curved airbags. In the present application the wording "airbag" is used to identify the inflatable part, or cushion, of an airbag assembly.

Passenger airbags are active safety systems designed to deploy between an occupant and an instrument panel during vehicles impacts; passenger airbags are also designed to avoid windshield damage during the deployment of airbags. Knee airbags are designed to deploy in front of the knee area of an occupant and can be mounted on both the driver and passenger sides; on the driver's side, knee airbags are located below the steering column while on the passenger's side, the airbag can be mounted below the glove box.

When a collision occurs, knee airbags inflate upwards to fill the space between the dashboard and the passenger's lower legs, while passenger airbags inflate downwards to fill the space between occupant and instrument panel. In both cases, the initial (straight) deployment direction of the airbag must change into a direction that follows the vehicle structure, upwards in the case of knee airbags and downwards in the case of a passenger airbag.

In order to have a curved airbag, i.e. in order to have an airbag in which the direction of deployment is changed, the known art makes use of several different techniques, sometimes combined together. Namely, production of known 3-D airbags requires at least one of the following techniques: complex cushion design with a large number of different pre-cut portions that must be sewn together in time-consuming processes; complex pre-folding; use of tethers and complex steps to attach tethers to the airbag fabric.

There are known airbags comprising a plurality of cells, chambers or compartments, and valves used to inflate the cushion. Tethers are also located inside the cushion airbag to prevent a violent impact of the airbag against the occupant during the airbag deployment.

U.S. Pat. No. 7,338,069 discloses an airbag comprising a plurality of cells and a plurality of valves, where each valve can connect a first cell to a second cell and is configured to close once a predetermined pressure is reached in the second cell, to prevent fluid outflow from the second cell. The inflator that fills the knee airbag is discharging into a manifold or a common distribution volume which distributes the filling gas to the cells of the airbag through the valves. The cells of the airbag can be contained in an envelope of plastic film or can be connected together along their adjacent edges. US 2011/101660 discloses an inflatable knee airbag having a plurality of inflatable chambers.

U.S. Pat. No. 8,622,418 discloses a knee airbag with a single cell including a separate internal tether. This document discloses a method of manufacturing a knee airbag including the steps of providing a single layer with a virtual central line and two panel surface parts; folding the two panel surface parts, connecting the parts to each other; folding an area of the virtual central line in the folding direction; and forming a sewing line to connect the first panel surface part to the second panel surface part. The method of manufacturing disclosed in this document provides a single cell knee airbag with separate internal tethers.

In US20050151351, a knee airbag capable of withstanding high internal pressures is formed from one continuous fabric sheet. The knee airbag has internal tethers to withstand the high internal pressure by maintaining the airbag at a constant volume and shape. Internal tethers are disposed within the airbag cushion and are attached to oppositely facing loops. The knee airbag further includes an external tether attached to the exterior of the airbag wall to control the direction of the deployment of the knee airbag.

Thus, as previously mentioned, known methods of manufacturing a curved airbag, i.e. a 3-D airbag, require a long, complex and expensive process with multiple and complex sewing patterns that are time consuming and that require a specialized workforce.

Moreover, during inflation of known curved airbags, the gas within the cushion does not propagate with an even distribution of pressure in the inner volume of the airbag. In fact, known knee airbags with a single cell unroll as the volume of the gas inside the cushion increases. Known airbags with multiple horizontal cells are filled sequentially, i.e. the first cell is filled before the second cell, and so on. The propagation of air with a uniform distribution of pressure inside all the cells the airbag cushion would promote a faster filling of the knee airbag and an even resistance of the cells when the occupant impacts the airbag.

SUMMARY OF THE INVENTION

An aim of the present invention is to solve the above problems and to provide a curved, 3-D, airbag that is not expensive and easy to produce, that requires a simple operation during installation and that provides a quick and uniform deployment during the inflation of the airbag.

Another aim of the present invention is to provide a curved airbag manufacturing process that is fast, economic and compatible with an ergonomic process for the workforce. A further aim of the present invention is to provide a simplified tether attachment in a curved airbag.

The present invention solves the above problems by means of an airbag according to claim 1. The airbag comprises a plurality of interconnected adjacent inflatable cells, wherein a cell is attached to an adjacent cell by at least two seam lines, said lines being spaced from each other to define a cell area, said cell area comprising a passage for gas between said adjacent cells. The invention airbag has at least a curved portion in its deployed state.

In embodiments of the invention, the airbag comprises at least two cells, each cell shares at least a wall with an adjacent cell, the shared wall is defined by the above-mentioned at least two seam lines and comprises a means for gas passage between said cells, said seam lines being located at opposite sides of the gas passage means. Each of the shared walls, between the seam lines, also may have the function of a tether within the structure of the airbag, i.e. it may act as an internal tether. In these embodiments, the wall that is shared between two adjacent cells of the airbag can perform the function of a tether for the airbag during the deployment, to maintain the required shape of the airbag.

In embodiments of the invention, cells are obtained from folded, single, pre-cut elements. The pre-cut elements may have two semi-portions that are symmetrically extending from a central axis of a pre-cut element; the semi-portions include curved parts, whereby when said semi-portions are folded and superimposed, a curved cell of an airbag is obtained. Preferably, the cells are formed by a single pre-cut element folded on itself and closed by a first seam line extending entirely along a first edge of said pre-cut element, and by a second seam line extending partially along a second edge of said pre-cut element at said curved zone of the airbag.

An advantage of the invention is that the manufacturing process of the invention can provide cells and internal tethers in an easy way, by folding and sewing the pre-cut elements, without requiring multiple manufacturing steps such as multiple sewing operations of several different parts. Additionally, embodiments of the invention provide an airbag with multiple cells, where the number of cells may be adjusted according to the available space in the vehicle structure, without changing the procedure used in the manufacturing process.

According to a manufacturing process two semi-portions of two pre-cut elements are partially overlapped so that at least part of the gas passage areas of the two semi-portions of the pre-cut elements are aligned. Once the pre-cut elements are overlapped, the pre-cut elements are sewn together with first and second junction seam lines spaced from and located at opposite sides of the gas passage area. The first and second junction seam lines provide the connection between adjacent cells in a final airbag. In fact, the area between the first and second junction seam lines defines the shared wall between adjacent cells. The area between the first and second junction seam lines also defines an "internal tether" of the airbag. Said area is provided with holes or other means to allow gas from an inflator to flow between adjacent cells.

According to an aspect a final airbag has two cells. In this case, each pre-cut element is folded to superimpose its edges and the edges of each pre-cut element are sewn together by means of at least a seam line to form one cell from each pre-cut element. In this way a two-cell airbag is obtained.

According to another aspect a final airbag has more than two cells. In this case, a new pre-cut element is partially overlapped with a pre-cut element of the group of pre-cut elements sewn together in the previous steps so that at least part of the gas passage areas of the two pre-cut elements are aligned. The two pre-cut elements are sewn together with a first and second junction seam lines spaced and located at opposite sides of the gas passage area. This process is repeated as many times as it is necessary to obtain the desired number of cells in the final airbag. More in detail, the number of cells obtained in the final airbag according to this case, is equal to the number of pre-cut folded elements sewn together. Once the desired number of cells is reached, each folded pre-cut element is folded to superimpose its edges and the edges of each pre-cut element are sewn together by means of at least a seam line to form one cell from each pre-cut element.

In another embodiment of the invention, each cell is obtained from two or more pre-cut half elements sewn together to form a joint pre-cut element. The joint pre-cut element is used as described before, i.e. as a single pre-cut element.

In another embodiment of the invention, each cell is obtained from two half pre-cut elements, i.e. two semi-portions, sewn together to provide a cell closed by a first seam line extending entirely along a first edge of said pre-cut elements, and by a second seam line extending entirely along a second edge of said pre-cut elements.

According to this embodiment, in the manufacturing process two pre-cut half elements (or semi-portions) are overlapped so that at least part of the gas passage areas of the two pre-cut elements are aligned. Once the pre-cut half elements are overlapped, they are sewn together with a first and second junction seam lines spaced from and located at opposite sides of the gas passage area. Preferably, this operation is repeated several times to provide several cells in the final airbag. More in detail, the number of cells obtained in the final airbag according to this embodiment, is equal to n/2 where n is the number of pre-cut half elements (i.e. of semi-portions) sewn together by aligning at least part of the gas passage areas thereof. The edges of at least a couple of pre-cut half elements are superimposed and the edges of each couple of pre-cut elements are sewn together by means of at least a seam line to form one cell of said plurality of cells. More in detail, a top pre-cut half element and a bottom pre-cut half element are overlapped to the pre-cut half elements sewn together so that the edges of the top half element and another half element and the edges of the bottom half element and another half element are superimposed and sewn together by means of at least a seam line to form one cell from each couple of half elements, or semi-portions.

In the present description the following definition are used for the following wordings:

pre-cut element: it is a piece of fabric or other material suitable to be used to make the an airbag. It is provided with two symmetrical semi-portions that can be folded and overlapped to each other. Once stitched along its edges it provides a cell of the final multi-cell airbag structure.

pre-cut half element: corresponds to half of the pre-cut element or, in other words, to a semi-portion of the pre-cut element. Two half elements may be sewn together to make a pre-cut element.

gas passage area: it is the area of two adjacent walls of adjacent cells defined by two seam lines that stitch together the cells. The gas passage area has holes or similar means to allow gas flow from one cell to another.

junction seam lines: any stitching line that is sewn to keep attached parts of two pre-cut elements and/or half elements.

airbag: the inflatable part, or cushion, of an airbag assembly. The airbag of the invention is obtained from or comprises a plurality of pre-cut elements or of half elements, or a combination of pre-cut elements and half elements, connected together.

BRIEF DESCRIPTION OF THE DRAWINGS

Further aspects and advantages of the present invention will be discussed more in detail with reference to the enclosed drawings, given by way of non-limiting examples, wherein.

DETAILED DESCRIPTION OF THE INVENTION

As shown in the attached figures, the airbag according to the present invention is a multiple-cell airbag that can be used in different deploying areas in a vehicle.

Figure 1:
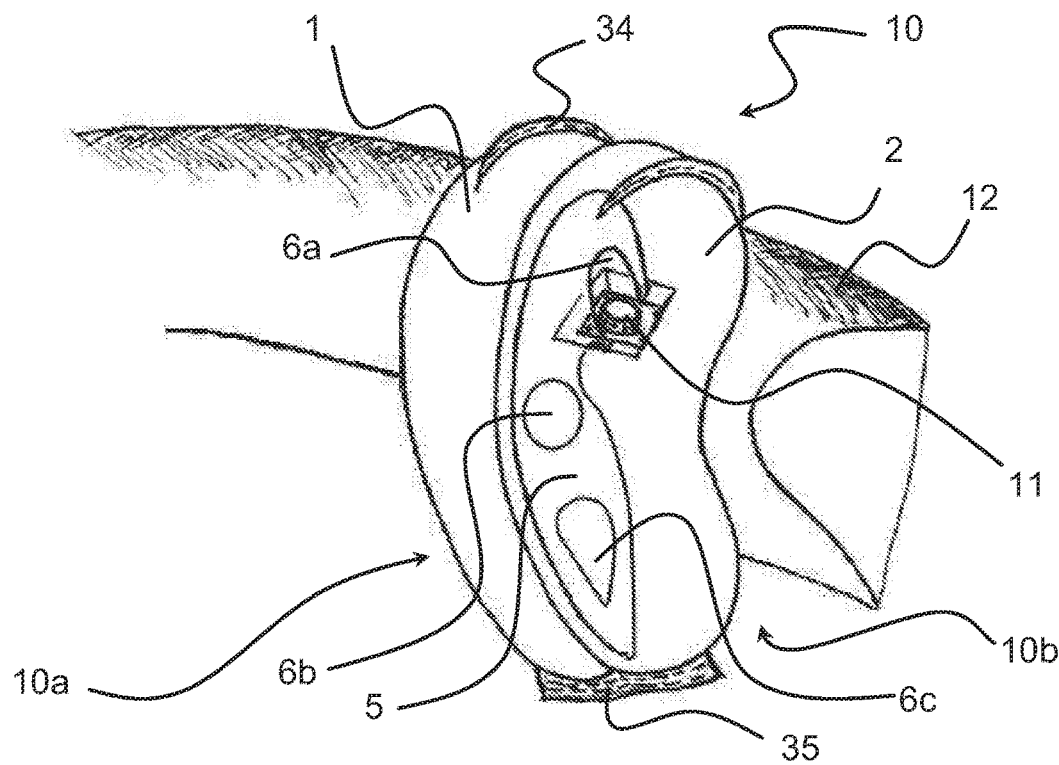
FIG. 1 is a view of an airbag of the present invention.

FIG. 1 shows a two-cell airbag 10 in a deployed configuration.

The airbag 10 in FIG. 1 is a passenger airbag (PAB). PABs commonly deploy between occupant and instrument panel 12 by changing the initial direction of the cushion. The cushion geometry is realised with a curved profile in order to change the initial direction and prevent damages to the windshield. The airbag module shown in FIG. 1 comprises an airbag 10 attached to the vehicle structure 12 and includes an inlet gas valve 11. The airbag 10 has a first cell 10a and a second cell 10b. According to other embodiments of the present invention, the airbag 10 may have more than two cells. The first cell 10a is formed by a first pre-cut element 1 and the second cell 10b is formed by a second pre-cut element 2. Cells 1 and 2 are separated by an internal wall 5 that also acts as an internal tether for the airbag 10. The internal tether wall 5 forms a transverse tether for providing the support necessary for the airbag during deployment expansion and to prevent an excessive swelling of the impact zone of the airbag in relation to the rear zone of the airbag. The wall 5 is provided with gas passage holes 6a, 6b and 6c that allow the distribution of the gas inside the airbag from the valve 11 to the cells 10a and 10b and a passage of gas between cells in general.

Figure 2:
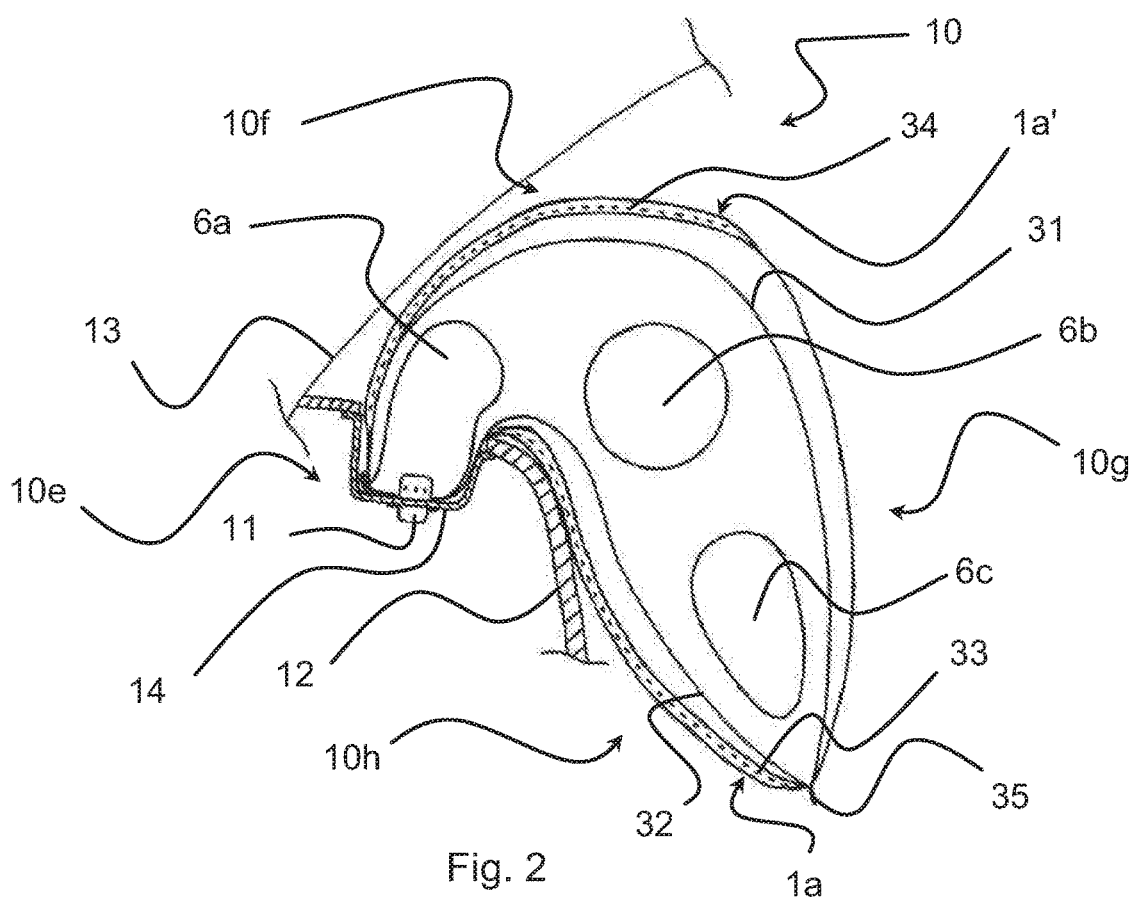
FIG. 2 is a section of view of an airbag of the present invention.

FIG. 2 shows a section view of the airbag of FIG. 1 in a deployed position ejecting from the vehicle structure 12. The airbag 10 has a curved profile so that it can be deployed in a position between the occupant, not shown in the figures, and the vehicle structure 12. The curvature of the airbag 10 prevents the airbag 10 from damaging the windshield 13 from the expansion of the cushion.

The airbag 10 presents an inflator-attachment zone 10e, a gas distribution zone 10f, an impact zone 10g and a rear zone 10h. The inflator-attachment zone 10e is the zone where the airbag 10 is attached to the vehicle structure 12 through the airbag housing 14. The airbag module also comprises a valve 11 for the introduction of gas inside the cushion. The gas inflated by the valve 11 is distributed in the cushion, i.e. in the plurality of cells of the airbag, through holes 6a, 6b and 6c. More in detail, the gas distribution zone 10f is the zone of the airbag 10 where the gas inflated through valve 11 is distributed to cells 1 and 2. A gas passage 69 is located in correspondence of valve 11. The impact zone 10g is the zone of the airbag suitable for receiving the passenger during an impact. On the opposite side of the impact zone 10g of the airbag cushion there is the airbag rear zone 10h, i.e. the zone of the airbag that faces the vehicle structure 12.

The airbag 10 has a curved geometry in correspondence of the gas distribution zone 10f. In its deployed configuration, the impact zone 10g of the airbag 10 lies on a plane inclined with respect to the deployment direction in correspondence of the inflator-attachment zone 10e. The curved geometry of the airbag 10 is obtained by a curvature radius in correspondence of the gas distribution zone 10f. By modifying the curvature radius, the curved geometry of the airbag can be adjusted to different shapes of different vehicle structures or to different inclination angles of the windshield with respect to the vehicle structure. The curved geometry can also be adjusted depending on the type of the airbag, i.e. a frontal passenger airbag, a lateral airbag, a pelvic airbag, a knee airbag or other airbags. The present invention encompasses all the known types of airbags and is not restricted to frontal airbags or knee airbags.

Figure 3:
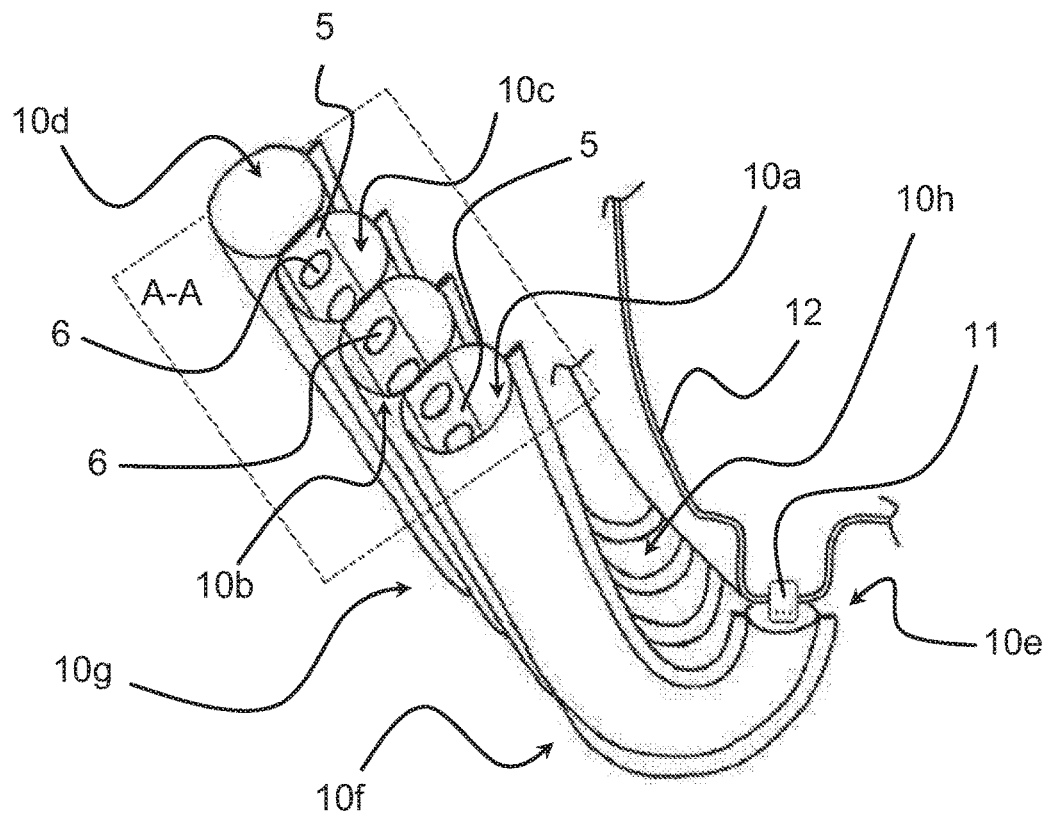
FIG. 3 is a view of a knee airbag of the present invention partly open.
Figure 4:
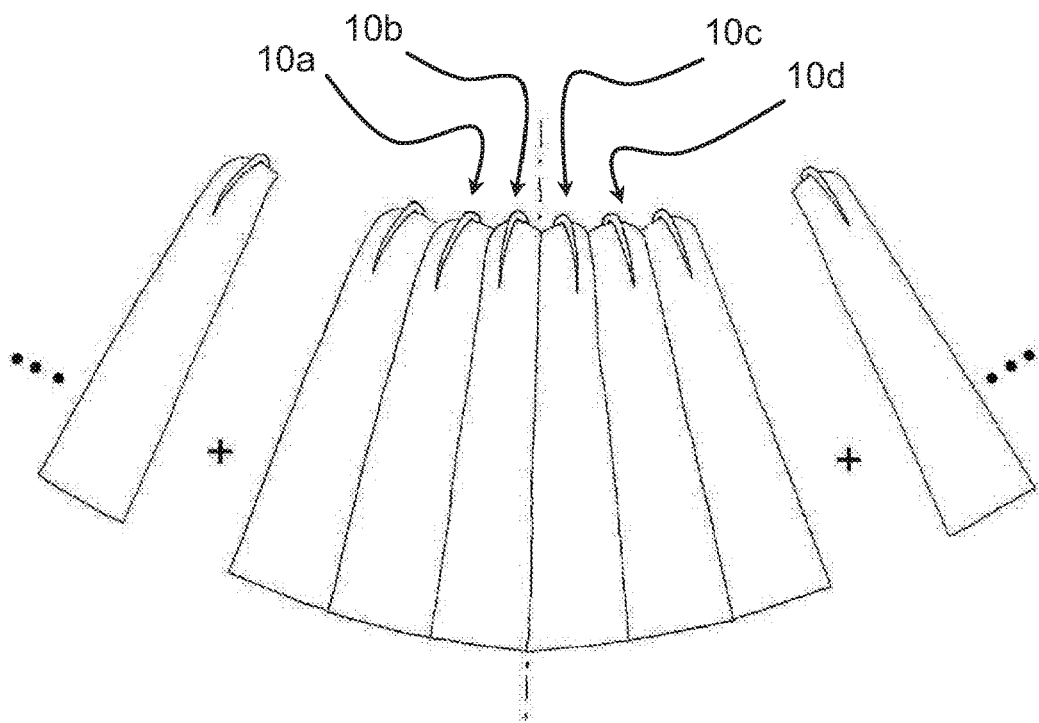
FIG. 4 is a schematic view of the airbag of the present invention showing a multiple-cell airbag.

FIG. 3 shows a knee airbag according to the present invention. The airbag 10 of FIG. 3 has four cells 10a, 10b, 10c and 10d. According to other embodiments of the present invention, the airbag 10 can have two or more cells; more in detail, the addition of a pre-cut element, addition of another cell during the manufacturing process of the airbag. FIG. 4 shows a schematic representation of the multiple-cells airbag. The airbag comprises a desired number of cells. In other words, according to the manufacturing process of the present invention, each cell is formed by at least a pre-cut element and more pre-cut elements can be added to the already joint pre-cut elements in order to form more cells. In a preferred embodiment, each cell is formed by a single pre-cut element. According to another embodiment of the present invention, each cell is formed by two pre-cut half elements. The knee airbag shown in FIG. 3 is open in correspondence of the extremity on the opposite side of the inflator-attachment zone 10e. Obviously, when the manufacturing process is completed, the cells will be sewn in correspondence of said extremity and the cell will be closed to the external environment.

As shown in FIG. 3, each cell of the airbag 10 shares with an adjacent cell at least a wall 5. For example, cell 10b shares a first wall 5 with cell 10a and a second wall 5 with cell 10c. In other words, each cell of the airbag 10 is separated from an adjacent cell by a wall 5. The wall 5 acts as an internal tether for the airbag 10. The internal tether is a transverse tether for providing the support necessary for the airbag to withstand during the deployment expansion and to prevent an excessive swelling of the impact zone of the airbag in relation to the rear area of the airbag. As already described for the frontal airbag shown in FIGS. 1 and 2, the knee airbag according to the present invention shown in FIG. 3 presents an inflator-attachment zone 10e, a gas distribution zone 10f, an impact zone 10g and a rear zone 10h.

Figure 5:
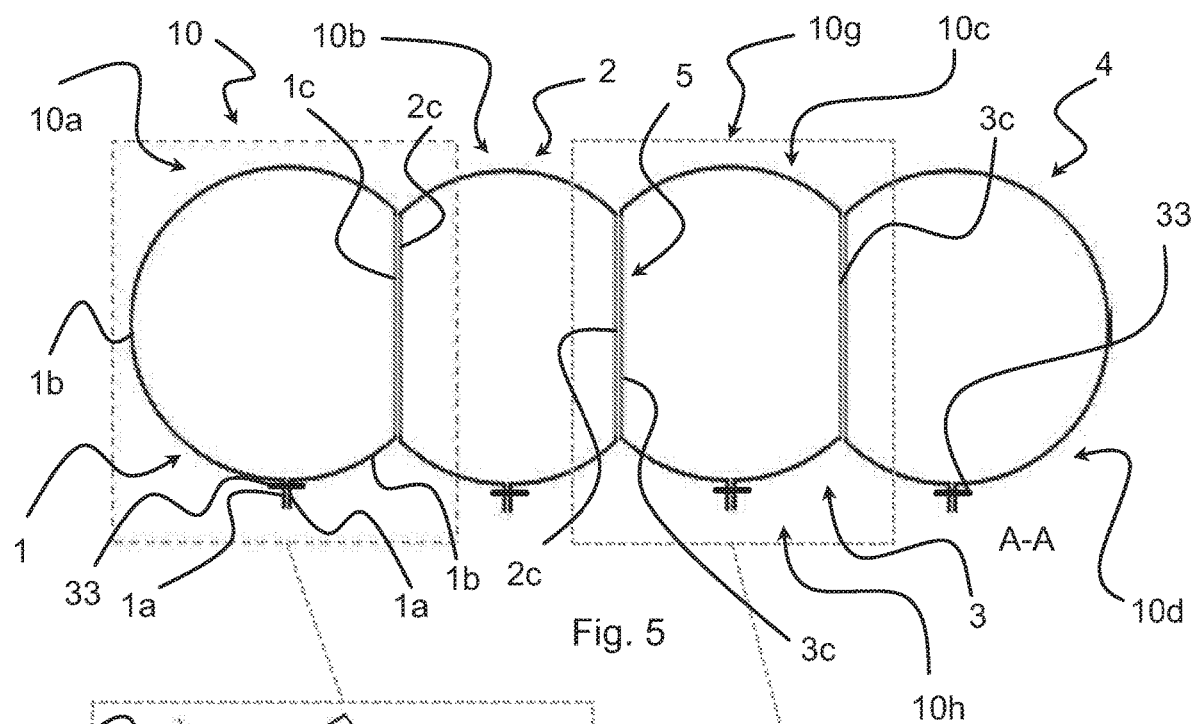
FIG. 5 is a sectional view of the airbag of FIG. 3, taken along plane A-A.

The structure of the airbag 10 according to the present invention is shown in FIG. 5, which is a section view of the airbag of FIG. 3 in correspondence of the plane A-A.

The section of the airbag 10 in FIG. 5 comprises four adjacent cells 10a, 10b, 10c, 10d; each cell formed by a pre-cut element 1, 2, 3 and 4. Each pre-cut element is folded and sewn along a seam allowance portion 1a, 2a, 3a and 4a, a body portion 1b, 2b, 3b and 4b, and a gas passage portion 1c, 2c, 3c and 4c. In the embodiment shown in FIG. 5, the seam allowance portions are arranged on the rear zone 10h of the airbag 10, which is on the opposite side of the impact zone 10g of the airbag 10. Preferably, the seams of the airbag cushion are not arranged on the impact zone since a smooth impact zone is preferred in case of impact of a passenger against the airbag. In fact, a smooth impact zone reduces the occurrence of damages to the passengers during the impact. According to other possible embodiments, seams are arranged on the impact zone, or on the impact zone and the rear zone.

As already described with reference to FIG. 3, each cell shares a wall 5 with an adjacent cell. A wall 5 is formed by two layers of the adjacent pre-cut elements 1-4 and has gas passage portions 1c-4c. More in detail, the wall between cells 10a and 10b is formed by the superimposed gas passage portions 1c and 2c of pre-cut elements 1 and 2; the wall between cells 10b and 10c is formed by the superimposed gas passage portions 2c and 3c of pre-cut elements 2 and 3; the wall between cells 10c and 10d is formed by the superimposed gas passage portions 3c and 4c of pre-cut elements 3 and 4.

Figure 6:
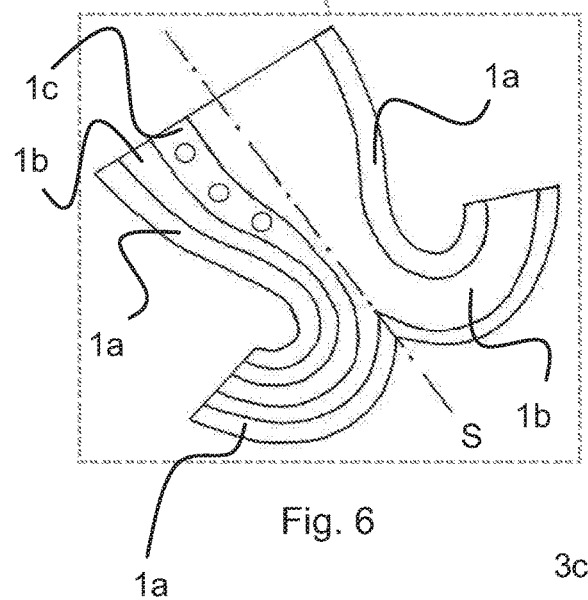
FIG. 6 is a pre-cut element of cell B of the airbag of FIG. 5.
Figure 7:
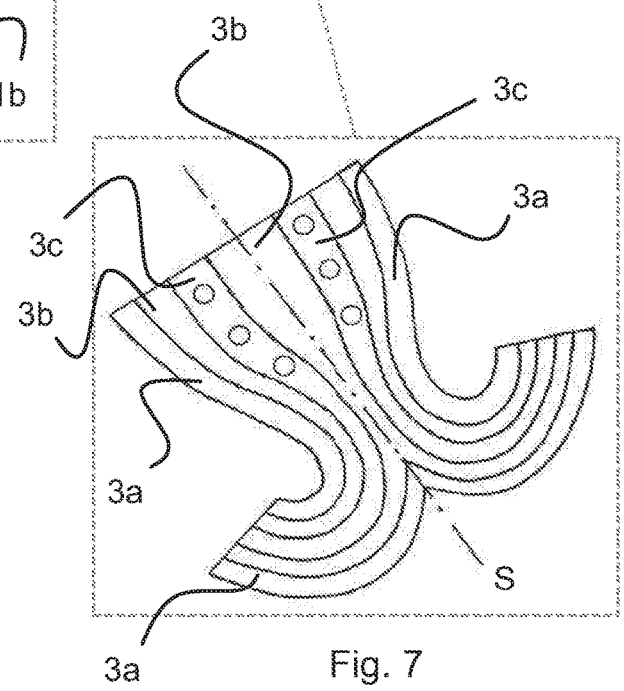
FIG. 7 is a pre-cut element of cell C of the airbag of FIG. 5.

Pre-cut elements associated to cells 10a and 10c are respectively shown in FIGS. 6 and 7. According to an aspect of the present invention, the airbag 10 is formed by external pre-cut elements and internal pre-cut elements. The external pre-cut elements are the pre-cut elements that form the external cells of the airbag, i.e. the last cell on one side of the airbag, and the last cell on the other side of the airbag when the cells are arranged in a row or column. In other words, the external cells are the cells that share just one wall with the adjacent cells, the internal cells are the cells that share two walls with the adjacent cells.

In the embodiment shown in FIG. 5, external pre-cut elements 1 and 4 form external cells 10a and 10d, internal pre-cut elements 2 and 3 form internal cells 10b and 10c.

External pre-cut element 1, associated to cell 10a, is shown in FIG. 6. The external pre-cut element 1 has a seam allowance portion 1a, a body portion 1b, and a gas passage portion 1c. The external pre-cut element has two half-portions that are symmetrical extending from a central symmetry axis S of the pre-cut element. The external pre-cut element has a first half-portion with the gas passage portion 1c that forms the wall 5 between cell 10a and cell 10b together with the gas passage portion 2c of pre-cut element 2. The external pre-cut element has a second half-portion without a gas passage portion, since the corresponding portion of the gas passage portion is part of the body portion.

Internal pre-cut element 3 associated to cell 10c is shown in FIG. 7. The internal pre-cut element 3 has a seam allowance portion 3a, a body portion 3b, and a gas passage portion 3c. The internal pre-cut element has two half-portions that are symmetrical extending from a central symmetry axis S of the pre-cut element. The internal pre-cut element has a first half-portion with a gas passage portion 3c that forms the wall 5 between cell 10b and cell 10c together with the gas passage portion 2c of pre-cut element 2. The internal pre-cut element has a second half-portion with a gas passage portion 3c that forms the wall 5 between cell 10c and cell 10d together with the gas passage portion 4c of pre-cut element 4.

The manufacturing process is able to provide cells and internal tethers in one step, i.e. without requiring multiple manufacturing processes such as multiple sewing operations.

The manufacturing process according to the present invention comprises the steps of:

a) providing a plurality of pre-cut elements, said elements having a portion that has at least one means for passage of gas;

b) overlapping two pre-cut elements and aligning at least part of the gas passage portion of said pre-cut elements;

c) sewing together said pre-cut elements with at least a first junction seam line and a second junction seam line, said lines are spaced and located at opposite sides of said gas passage portion to provide a connection between adjacent cells in a final airbag.

According to a first embodiment of the present invention, each cell of the multiple-cell airbag 10 is obtained by one folded pre-cut element. According to a second embodiment of the present invention, each cell of the multiple-cell airbag 10 is obtained by two superimposed pre-cut elements.

Figure 8:
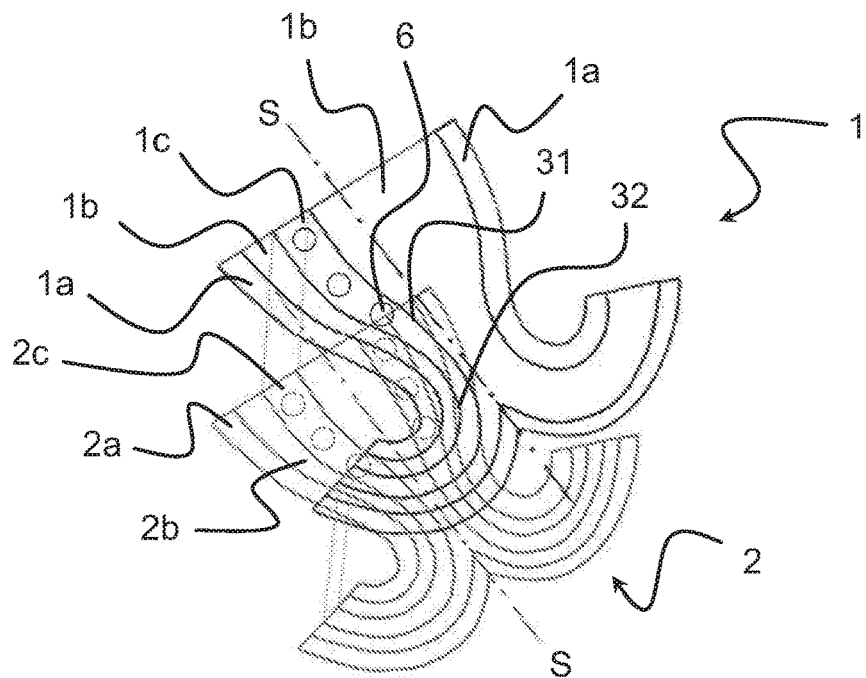
FIG. 8 is a perspective view of the step of overlapping two pre-cut elements according to the process of the present invention.

As shown in FIG. 8, the manufacturing process according to the first embodiment of the present invention, comprises the step of overlapping two pre-cut elements by aligning at least part of the gas passage portions, includes 6, of the pre-cut elements in order to allow the flow of gas through holes 6 when the two pre-cut elements are overlapped. For example, the manufacturing process may start by overlapping the external pre-cut element 1 on the internal pre-cut element 2, as shown in FIG. 8. In general, the manufacturing process comprises the step of overlapping at least two pre-cut elements, i.e. in FIG. 4-11 the process includes aligning two internal pre-cut elements, an internal and an external pre-cut element.

The following FIGS. 9-14 are schematic representations of the pre-cut elements during subsequent steps of the manufacturing process according to the present invention. FIGS. 9-14 are views of pre-cut element section transverses with respect to the symmetry axis S of the pre-cut elements. The pre-cut elements symmetry is represented in FIGS. 9-14 by dotted lines S'.

Figure 9:
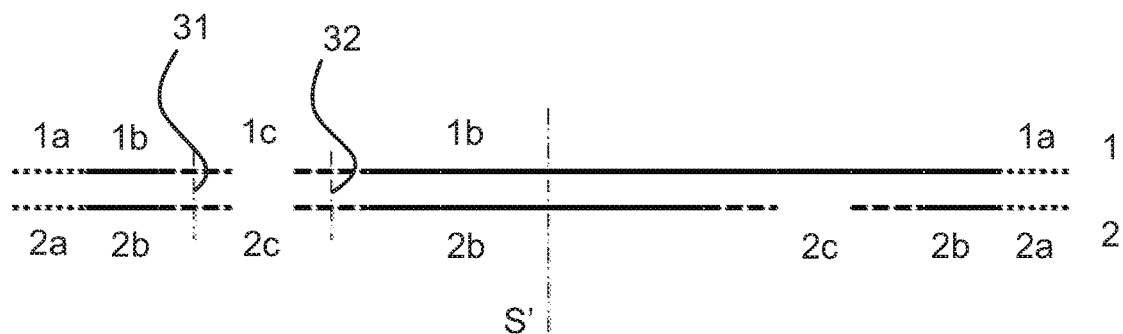
FIGS. 9-11 are schematic views of successive steps of sewing together with junction lines four pre-cut elements to provide a basis for a 4-cell airbag.

FIG. 9 shows two pre-cut elements superimposed after the overlapping step shown in FIG. 8. The superimposed pre-cut elements 1 and 12 are sewn together along lines 81, 82 in correspondence of the margins of at least a gas passage portion as shown by dotted lines. More in detail, the pre-cut elements 1 and 2 are sewn together by a first junction seam line S" and a second junction seam line 82 that are spaced from each other and on opposite sides of holes 6. Lines 81, 82 define an area of the cell gas passage portions 1c and 2c. The junction sewing lines 81, 82 are spaced and located at opposite sides of the gas passage portions to provide a connection between the adjacent cells 1 and 2. The gas passage portions 1c, 2c sewn together by the two junction sewing lines on their external margin, form a wall between the cells 1 and 2. In other words, the wall between the cells 1 and 2 is formed by the two gas passage portions 1c and 2c overlapped and sewn together.

According to the present invention, the step of overlapping two pre-cut elements and sewing together the pre-cut elements can be repeated several times to provide several cells in the final airbag. Each cell is sewn with at least another cell.

Figure 10:
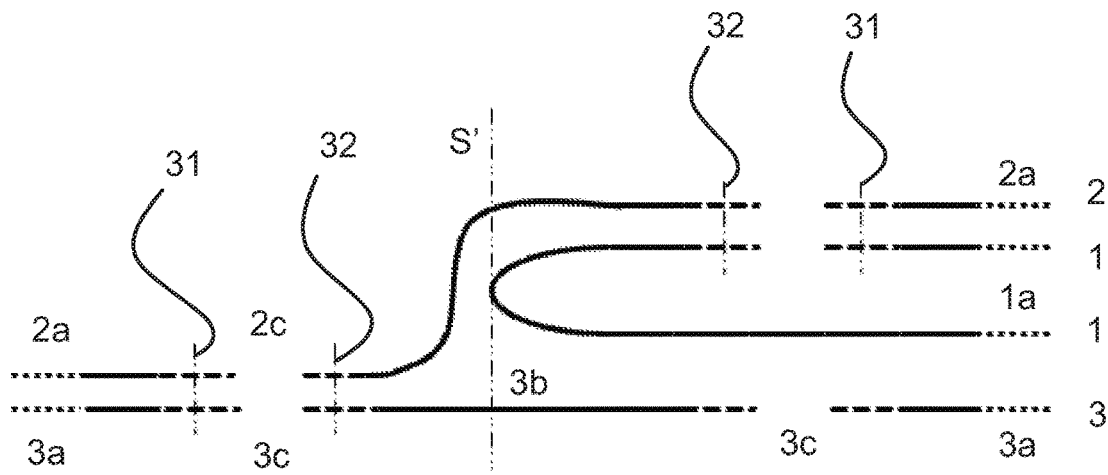

For example, as shown in FIG. 10, superimposed sewn together portions a pre-cut element 1-2 are folded away and the free end 29 of the cut 2, is overlapped with a further pre-cut element 3. More in detail, the gas passage portion 2c of pre-cut 2 is overlapped of the gas passage portion 3c of pre-cut element 3. The superposition is realised so that at least part of the holes 6 of the gas passage portions 2 and 3 are aligned. Once the pre-cut elements 2 and 3 are overlapped, pre-cut elements 2 and 3 are sewn together with two junction seam lines 31, 32 represented in FIG. 10 by two dotted lines.

Figure 11:
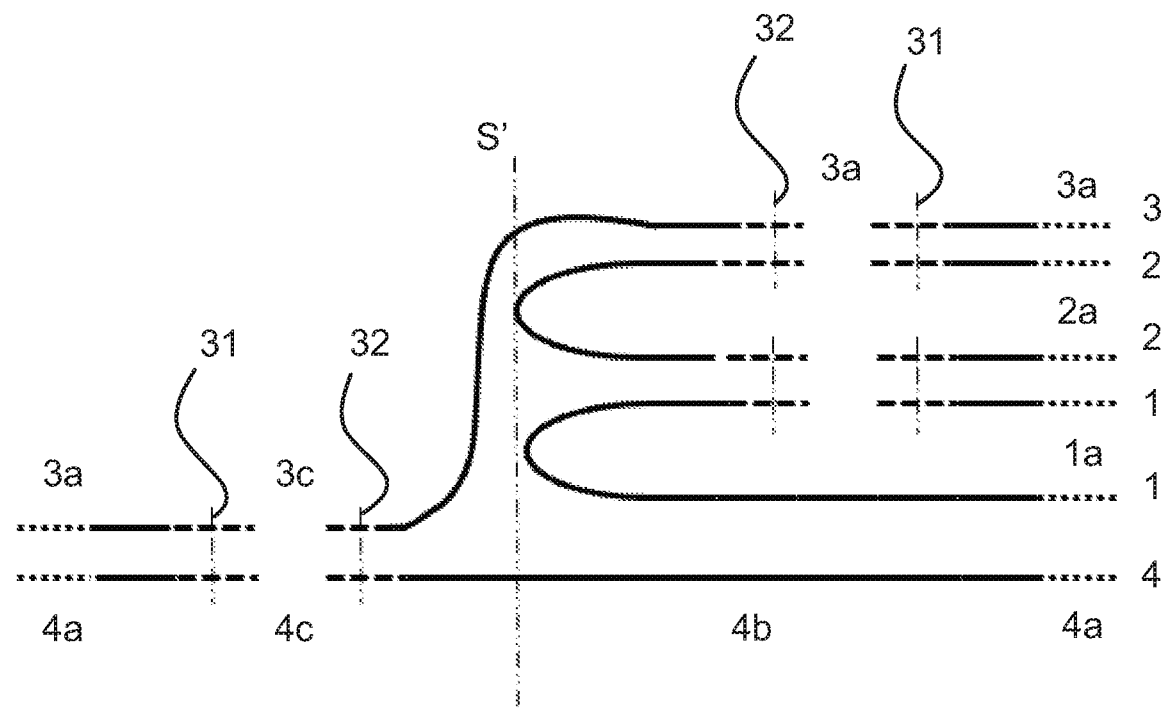

FIG. 11 shows a further step of partially overlapping two pre-cut elements 3, 4 and sewing together the pre-cut elements. The step shown in FIG. 11 is similar to the step shown in FIG. 10, except for the fact that the further pre-cut element 4 added to the airbag is not an internal pre-cut element, but is external pre-cut element 4. According to this embodiment, the four-cell final airbag of FIG. 5 is obtained pre-cut element 4 is the last pre-cut element added to the airbag. According to the process of the present invention, a pre-cut element 2 is folded and another pre-cut element 3 already sewn together with the folded pre-cut element 2 is overlapped with element 4. More in detail, the gas passage portion 3c is overlapped to the gas passage portion 4c of pre-cut element 4. The superposition is realised so that at least part of the holes of the gas passage portions is aligned. Once the pre-cut elements 3 and 4 are overlapped, pre-cut elements 3 and 4 are sewn together with two junction seam lines represented in FIG. 11 by two dotted lines.

Figure 12:
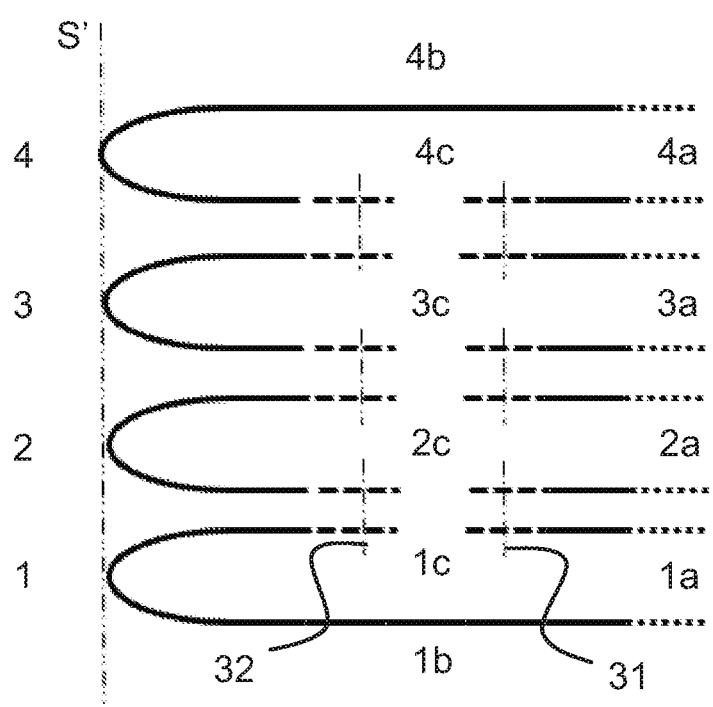
FIG. 12 is a schematic view of the folded pre-cut elements obtained in FIGS. 9-11, with superimposed edges.

As shown in FIGS. 10, 11 and 12, once the pre-cut elements are sewn together at lines 31, 32 in correspondence of the gas passage portions, the manufacturing process according to the present invention comprises the step of folding half of each pre-cut element to superimpose its edges. In other words, the pre-cut elements are folded so that the seam allowance portions of the pre-cut elements 1a, 2a, 3a and 4a are superimposed.

FIG. 12 shows the configuration of the airbag when all the pre-cut elements are folded and the seam allowance portions 1a, 2a, 3a and 4a are superimposed.

Figure 13:
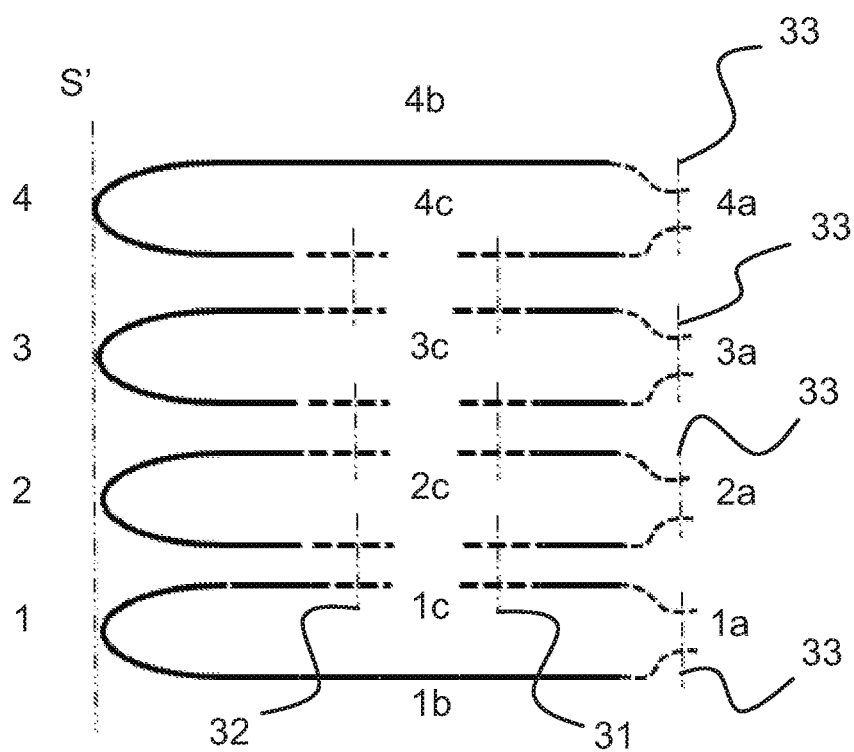
FIG. 13 is a schematic view of the step of sewing together the edges of each pre-cut element by means of a seam line.
Figure 14:
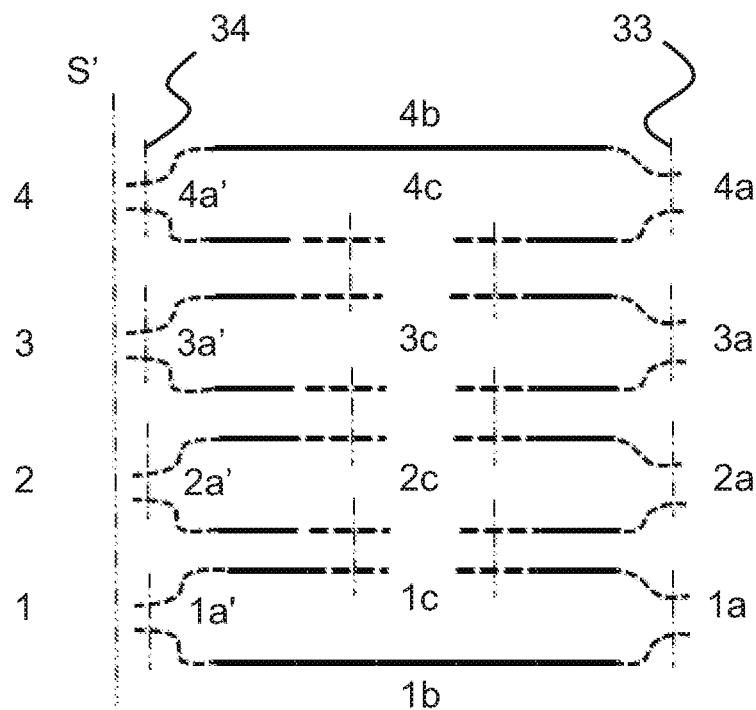
FIG. 14 is a schematic view of the step of sewing together the edges of a pre-cut element made by two half elements by means of two seam lines.

Once the folded configuration shown in FIG. 12 is obtained, the following step of the manufacturing process according to the present invention shown in FIGS. 13 and 14, is the step of sewing together the seam allowance portions of the same folded pre-cut element.

The step of sewing together the edges of each pre-cut element is realised by at least a seam line 33 on the seam allowance portions of each pre-cut element. For example, pre-cut elements of the curved airbag of FIGS. 3 and 5 have one seam allowance portion zone on one side as shown in FIG. 13, corresponding to plane A-A of FIG. 3. FIG. 14 shows two seam allowance portion zones, corresponding to part 10f of FIG. 3, i.e. the curved zone of the airbag has two sewing edge areas. More in detail, FIG. 13 shows the view of the section of pre-cut elements far from the inflator-attachment zone. In this zone, (plane A-A) each pre-cut element has just one edge for each semi-portion, i.e. one zone of superimposition of the seam allowance portion for seam line 33. On the other hand, FIG. 14 shows the view of the section of pre-cut elements near the inflator-attachment zone. In this zone, each pre-cut element has two edges for each semi-portion, i.e. two zones of superimposition of the seam allowance portion, for seam lines 33 and 34, respectively. Seam lines 33 and 34 stitch together portions of the same pre-cut elements, seam lines 31 and 32 stitch together portions of different pre-cut elements.

The step of sewing together the edges of each pre-cut element realises the cells of the airbag. In fact, each pre-cut element 1, 2, 3 and 4, folded and sewn in correspondence of lines 33, 34 at the seam allowance portion 1a-4a, 1a'-4a', is a closed surface connected with the adjacent cell by at least a wall 5.

The closure of the pre-cut element surface in correspondence of one extremity of the airbag, i.e. the extremity on the opposite side of the inflator-attachment zone, is realised by a seam line. According to a possible embodiment, the seam line in correspondence of one extremity of the airbag may be the same seam line of the external seam allowance portion zone shown in FIG. 13. In other words, the pre-cut element may be closed by a continuous curved seam line extending along the entire external edge of the pre-cut element. According to another embodiment, the seam line in correspondence of one extremity of the airbag is a seam line different from the seam lines shown in FIGS. 13 and 14. According to this embodiment, the seam line in correspondence of one extremity of the airbag is obtained by a seam line 35 provided along the open extremity of the cells e.g. at 90° with respect of seams 33, 34. This seam line closes the extremity of the cells in correspondence of one extremity of the airbag as shown in FIG. 1.

Each cell of the airbag obtained according to the manufacturing process described as above is formed by one pre-cut element including two symmetrical portions.

Figure 15:
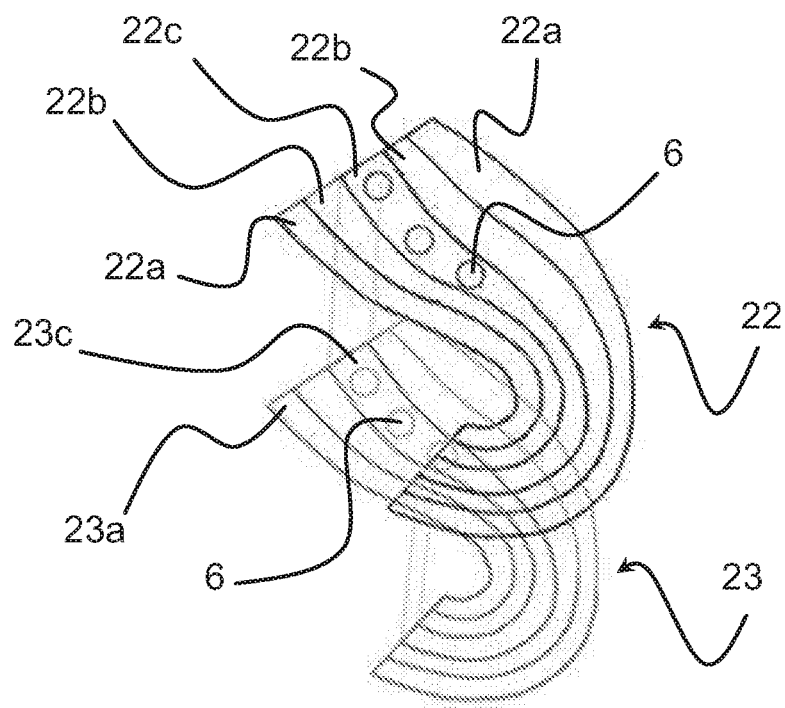
FIG. 15 is a perspective view of the step of overlapping two pre-cut half elements.

According to a possible embodiment of the present invention, each cell of the airbag is obtained by two pre-cut half elements as visible in FIG. 15.

The impact zone of the airbag whose cells are formed by two pre-cut half elements can be shaped so that the curvature of the impact zone can be designed according to the project requirements of the airbag. According to this embodiment the pre-cut elements are sewn together along at least one seam line. For example, the pre-cut elements are sewn along a first seam line for the impact zone of the airbag, and a second seam line for the rear zone of the airbag. For this reason, the manufacturing process could not include the step of folding the pre-cut element in correspondence of the symmetry axis S' as shown in FIGS. 10-12.

FIGS. 15-18 show the manufacturing process of the present invention according to the embodiment of the airbag where each cell is formed by two pre-cut half elements. In other words, each cell of the embodiment shown in FIGS. 15-18 is formed by the superimposition of two pre-cut half elements.

As shown in FIG. 15, pre-cut half elements 22 and 23 are substantially equivalent to the half-portions of pre-cut elements 1, 2, 3 and 4 described before. Each pre-cut half element 22 and 23 has a seam allowance portion 22a and 23a, a body portion 22b and 23b, and a gas passage portion 22c and 23c. The manufacturing process comprises the step of overlapping two pre-cut elements by aligning at least part of the gas passage portions and holes 6 of the pre-cut elements in order to allow the flow of gas through holes 6 when the two pre-cut elements are overlapped. According to this embodiment, the manufacturing process may comprise the step of overlapping two internal pre-cut half elements 22, 23 as shown in FIG. 15.

Figure 16:
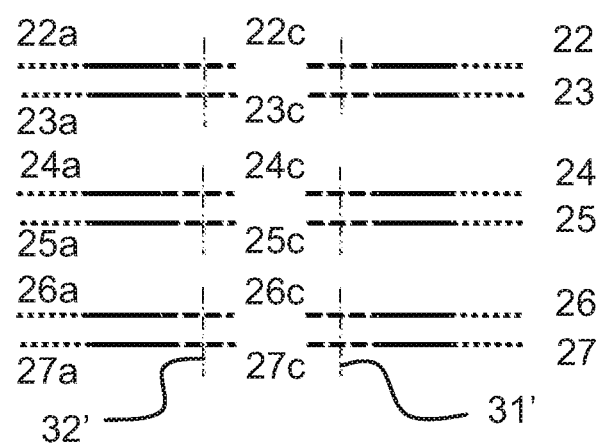
FIG. 16 is a schematic view of the steps of sewing together two pre-cut elements with a first junction seam line and a second junction seam line.
Figure 18:
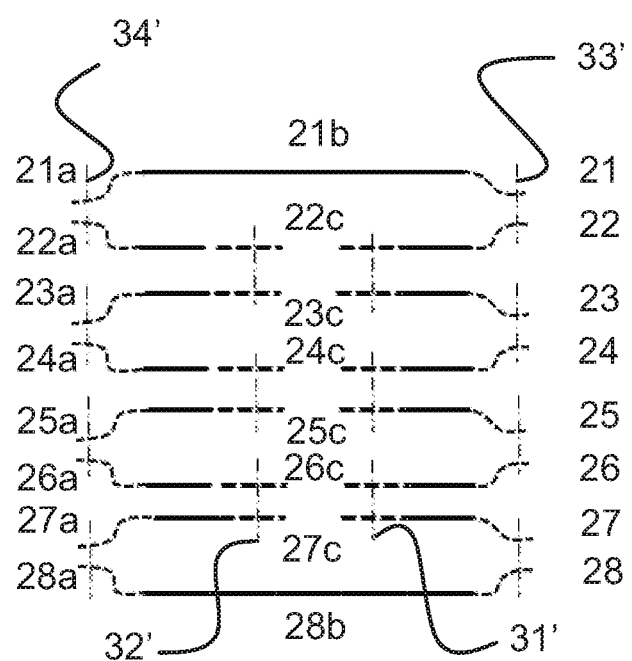
FIG. 18 is a schematic view of the final air bag obtained by a plurality of pre-cut half elements.

Once the step of the two pre-cut half elements are overlapped, the following step of the manufacturing process is sewing the overlapped pre-cut elements 22 and 23 at lines 31,32 to define the gas passage portions 22c and 23c. The seam lines 31', 32' are represented in FIGS. 16 and 18 by dotted lines. The junction sewing lines 31', 32' are spaced and located at opposite sides of the gas passage portions to provide a connection between the adjacent cells 1 and 2. The gas passage portions 22c and 23c sewn together by the two junction sewing lines on their external margin, form a wall between the cells 1 and 2. In other words, the wall between the cells 1 and 2 is formed by the two gas passage portions 22c and 23c overlapped and sewn together.

According to the present invention, the step of overlapping two pre-cut elements and sewing together the pre-cut elements can be repeated several times to provide several cells in the final airbag.

For example, as shown in FIG. 16, pre-cut elements 24, 25 and 26, 27 are overlapped and sewn together. More in detail, the gas passage portion 24c of pre-cut half element 24 is overlapped on the gas passage portion 25c of half element 25. The superposition is realised so that at least part of the holes of the gas passage portions are aligned. Once the pre-cut elements 24, 25 are overlapped, half elements 24 and 25 are sewn together with two junction seam lines represented in FIG. 16 by two dotted lines in correspondence of gas passage portions 24c and 25c. The same operation is performed for half elements 26, 27 to define respective gas passage portions 26c and 27c.

Figure 17:
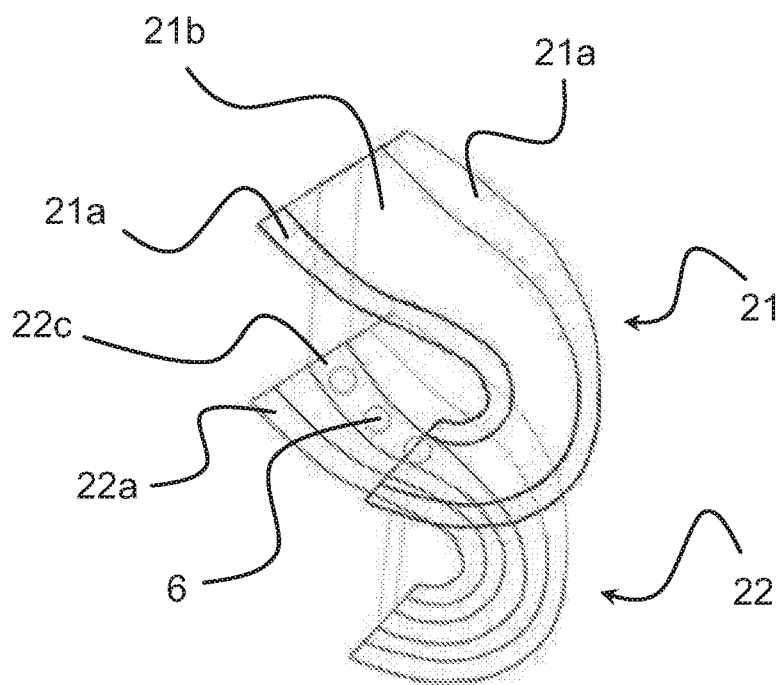
FIG. 17 is a perspective view of a couple of pre-cut half elements forming an end-cell of the airbags.

FIG. 17 shows the step of completing the structure of the airbag by overlapping two external half elements, i.e. a free-cut half element that does not have a gas passage portion. More in detail, the external pre-cut element 21 has a seam allowance portion 21a and a body portion 21b. Pre-cut element 21 is overlapped to pre-cut element 22 so that the edges of pre-cut elements 21 and 22 are superimposed. The same operation is performed for another external pre-cut element 28 with a seam allowance portion 28a and a body portion 28b, overlapped on pre-cut element 27, as shown in FIG. 18. Also, pre-cut elements 23, 24, and 25, 26 are overlapped.

Once pre-cut elements are overlapped so that their edges are superimposed, the manufacturing process further comprises the step of sewing together the edges of each couple of pre-cut elements in order to form the cells of the airbag. The sewing step is made with at least two seam lines 33', 34' on the edges of the pre-cut elements as shown by dotted lines in FIG. 18. More in detail, the seam lines are realised on the seam allowance portions of each couple of pre-cut elements 21a and 22a, 23a and 24a, 25a and 26a, 27a and 28a. The seam lines in this sewing step join together the pre-cut elements not already sewn during the previous sewing step shown in FIG. 16, i.e. the pre-cut elements stitched together in correspondence of the gas passage portions. In this way, cells 1, 2, 3 and 4 are obtained respectively by joining pre-cut elements 21 and 22, 23 and 24, 25 and 26, 27 and 28.

The closure of the pre-cut element surface in correspondence of one extremity of the airbag, i.e. the extremity on the opposite side of the inflator-attachment zone, is realised by a seam line as above described.

According to another aspect of the present invention, the seam allowance portion 33' corresponding to the impact zone of the inflated airbag is sewn so as to be positioned in the internal volume of each cell of the airbag. In other words, each cell is formed by at least two pre-cut elements sewn together to provide a cell closed by at least a first and second seam lines, said first margin seam line extending along a first edge of said pre-cut elements and said second margin seam line extending along a second edge of said pre-cut elements; in such a case, a margin seam line chosen between said first margin seam line and said second margin seam line.

Although several preferred embodiments are illustrated and described above, there are possible combinations using other geometries and different dimensions of the multi-cell airbags according to the present invention. Also, the arrangement of adjacent cells in row or columns is arbitrary, and other embodiments of cells disposed along curved lines or a circle are admitted.

Also, the seam lines described above for the connection of pre-cut elements or for joining the edges of a pre-cut element, can be replaced by other sealing means, for example by hot-welding or gluing pre-cut elements.

The invention claimed is:

1. An airbag comprising:
a plurality of interconnected adjacent inflatable cells, wherein each cell is attached to an adjacent cell by at least two junction seam lines, said at least two junction seam lines being spaced from each other to define a cell area, said cell area comprising a gas passage portion between said adjacent cells,
wherein said airbag has a storage position and a deployed position in which the airbag has an impact zone and an inflator-attachment zone, and wherein said airbag in its deployed position has at least one curved zone, wherein said at least one curved zone is obtained in a gas distribution zone having a curvature radius, whereby in the deployed position of the airbag, said impact zone lies on a plane inclined with respect to the deployment direction of said inflator-attachment zone and wherein each cell is formed by a single pre-cut element closed by a first margin seam line extending entirely along a first edge of said pre-cut element, and by a second margin seam line extending partially along a second edge of said pre-cut element at said curved zone of the airbag, wherein the at least two junction seam lines are curved.

2. An airbag according to claim 1, wherein in said deployed position of said cell area defines a wall acting as a tether for the airbag.

3. An airbag of claim 2, wherein said wall extends in a direction that is substantially transverse to a plane defined by said impact zone of the airbag.

4. An airbag according to claim 1, wherein said pre-cut element comprises a seam allowance portion for said first margin seam line and said second margin seam line.

5. An airbag according to claim 4, wherein at least part of said seam allowance portion is sewn inside the volume of said cell.

6. An airbag according to claim 1, wherein several pre-cut elements are sewn together by said junction seam lines at said cell area to provide a line of adjacent cells.

7. A pre-cut element for producing a multi-cell airbag according to claim 1, said element having an area that provides at least one means for passage of gas and two semi-portions that are symmetrical extending from a central axis (S) of said element, said semi-portions including curved parts, whereby when said semi-portions are folded and superimposed so that a curved cell of an airbag is obtained.

8. An airbag according to claim 1, wherein the first margin seam line and the second margin seam line are curved.

9. An airbag according to claim 8, wherein at least a portion of the at least two junction seam lines, at least a portion of the first margin seam line, and at least a portion of the second margin seam line are parallel to each other.

10. An airbag comprising a plurality of interconnected adjacent inflatable cells, wherein each cell is attached to an adjacent cell by at least two junction seam lines, said at least two junction seam lines being spaced from each other to define a cell area, said cell area comprising a gas passage portion between said adjacent cells, wherein said airbag has a storage position and a deployed position in which the air-bag has an impact zone and an inflator-attachment zone, and wherein said airbag in its deployed position has at least one curved zone, wherein said at least one curved zone is obtained in a gas distribution zone having a curvature radius, whereby in the deployed position of the airbag, said impact zone lies on a plane inclined with respect to the deployment direction of said inflator-attachment zone and wherein each cell is formed by at least two pre-cut elements sewn together to provide a cell closed by at least a first margin seam line and second margin seam line, said first margin seam line extending entirely along a first edge of said pre-cut elements and said second margin seam line extending entirely along a second edge of said pre-cut elements, wherein the at least two junction seam lines are curved.

11. An airbag according to claim 10, wherein the first margin seam line and the second margin seam line are curved.

12. An airbag according to claim 11, wherein at least a portion of the at least two junction seam lines, at least a portion of the first margin seam line, and at least a portion of the second margin seam line are parallel to each other.

13. An airbag comprising a plurality of interconnected adjacent inflatable cells, wherein each cell is attached to an adjacent cell by at least two junction seam lines, said at least two junction seam lines being spaced from each other to define a cell area, said cell area comprising a gas passage portion between said adjacent cells, wherein said airbag has a storage position and a deployed position in which the air-bag has an impact zone and an inflator-attachment zone, and wherein said airbag in its deployed position has at least one curved zone, wherein said at least one curved zone is obtained in a gas distribution zone having a curvature radius, whereby in the deployed position of the airbag, said impact zone lies on a plane inclined with respect to the deployment direction of said inflator-attachment zone and wherein said gas passage portion in said cell areas comprises holes in the side of said cells, said holes in one cell being at least in part superimposed to the holes in an adjacent cell; said holes being kept in place by said junction seam lines sewing lines stitching together said cells, wherein the at least two junction seam lines are curved.

14. An airbag according to claim 13, wherein said cell is formed by a single pre-cut element closed by a first margin seam line extending entirely along a first edge of said pre-cut element, and by a second margin seam line extending partially along a second edge of said pre-cut element at said curved zone of the airbag, wherein the first margin seam line and the second margin seam line are curved.

15. A process according to claim 14, wherein at least a portion of the first junction seam line, at least a portion of the second junction seam line, at least a portion of the first margin seam line, and at least a portion of the second margin seam line are parallel to each other.

16. A process for producing an inflatable airbag comprising a plurality of cells, said process comprising the steps of:
 a) providing a plurality of pre-cut elements, said elements having a portion that has at least one means for passage of gas;
 b) overlapping two pre-cut elements and aligning at least part of the gas passage portion of said pre-cut elements;
 c) sewing together said pre-cut elements with at least a first junction seam line and a second junction seam line, said junction seam lines are spaced and located at opposite sides of said gas passage portion to provide a connection between adjacent cells in a final airbag, wherein said junction seam lines are curved;
 d) folding a pre-cut element to superimpose its edges and sewing together the edges of each pre-cut element by means of at least a margin seam line to form one cell of said plurality of cells and wherein steps b) and c) are repeated several times to provide several cells in the final airbag, and wherein said pre-cut elements have two semi-portions that are symmetrical extending from a central axis (S) of said element, said semi-portions including curved parts, whereby when said semi-portions are folded and superimposed, a curved cell of an airbag is obtained and wherein at least a pre-cut element of said pre-cut elements is formed by a plurality of separate semi-portions joined together.

17. A process according to claim 16, wherein said cell is formed by a single foldable pre-cut element.

18. A process according to claim 16, wherein said pre-cut elements are obtained by sewing together separate semi-portions along said central axis (S).

19. A process according to claim 16, wherein in step d) a first margin seam line is provided entirely along a first edge of said superimposed pre-cut element and a second margin seam line extends along the edge of said curved part of the said superimposed pre-cut element.

20. A process according to claim 19, wherein the first margin seam line and the second margin seam line are curved.

* * * * *